Oct. 14, 1947. M. DI SALINO 2,428,839
HOOD FOR COOKING UTENSILS
Filed Jan. 31, 1946
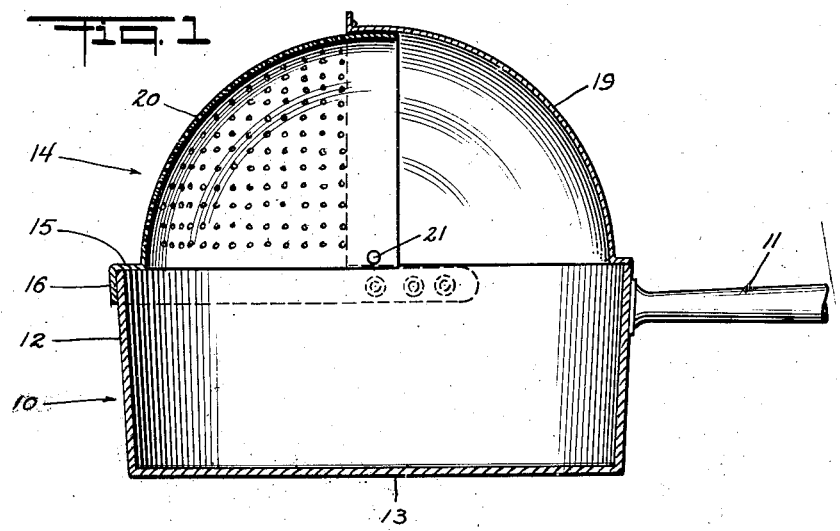
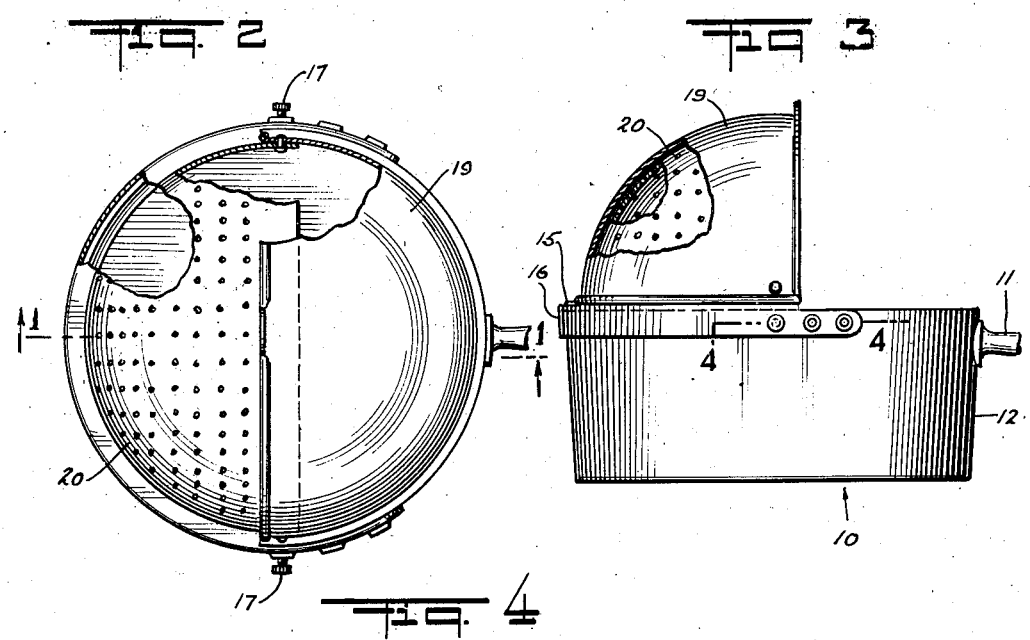
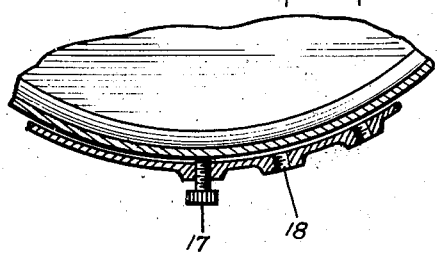
INVENTOR.
Marco Di Salino
BY *Irving Seidman*
ATTORNEY Patented Oct. 14, 1947

2,428,839

UNITED STATES PATENT OFFICE 2,428,839

HOOD FOR COOKING UTENSILS

Marco Di Salino, New York, N. Y.

Application January 31, 1946, Serial No. 644,574

1 Claim. (Cl. 220—30)

This invention relates to a closure for cooking vessels.

Broadly, it is an object of my invention to provide a cover for cooking utensils which will permit a certain amount of steam to escape from the vessel and at the same time retain a percentage of the heat and moisture within the said cooking utensil to maintain the flavor of the food being cooked.

More particularly, it is an object of my invention to provide a cover or hood for a cooking utensil, said cover being hingable in order to provide access to the food being cooked at the same time providing means for retaining heat and moisture within the cooking utensil and providing a means for the escape of steam, also, this food will not shrink as much.

A further object of my invention is to provide a hood for a cooking utensil which may be adjustable for pots of different circumference within limited measurements.

A further object of my invention is to provide a hood for cooking utensils in order to retain heat and moisture within said vessel so that certain types of food may be more thoroughly and better cooked at the same time saving a certain amount of fuel such as gas, since the flame may be turned lower because of the retention of heat within the vessel.

In cooking meats, the natural juices, added flavors and sauces in many instances stick to the pot because of the amount of heat required. With the use of my hood, the heat is applied slowly thus preventing the sauce and juice from sticking to the pot and causing burning.

For a fuller understanding of the nature and objects of my invention, reference is had to the following detailed description in connection with the accompanying drawings, in which:

Figure 1 is a cross sectional view of a cooking vessel containing a hood.

Figure 2 is a top view of the vessel shown in Figure 1 with parts broken away.

Figure 3 is a side elevation of the hood applied to the vessel showing one half telescoped within the hood, parts being broken away.

Figure 4 is an enlarged sectional view showing the adjustable means for attaching the hood to the upper edge of the vessel.

Numeral 10 represents a cooking utensil, such as a pot, having a handle 11, sides 12 and a bottom 13. Upon pot 10 a hood 14 is set having a shoulder 15 and a flange 16. Hood 14 is made of thin flexible metal so that the flange 16 may be adjusted along the outer circumference of the pot 10 by tightening screw 17 within one of the threaded openings 18, as shown in Figure 4. Shoulder 15 rests upon the upper edge of the sides 12 of the pot 10. The hood 14 is semi-circular and dome shaped and comprises a stationary part 19 and a movable part 20 which pivots along the central axis by pivot pins 21. The movable portion 20 is preferably perforated as shown in the drawings.

I have found that in cooking certain types of food it is desirable to retain a certain percentage of the heat within the vessel and permit a certain portion of the heat and moisture to escape. I have, therefore, provided a dome shaped hood so that the moisture which rises will condense along the inner surface of the hood and retain a certain percentage of the moisture within the vessel while some of the moisture is permitted to escape through the perforations of the movable portion 20. I have also found that the rising heat will be to a great extent reflected from the inside of the dome downwardly, thus providing reflected heat upon the food to more thoroughly cook the food and cause the food to retain its flavor.

When it is desired to stir the food within the utensil 10, the movable portion 20 of the hood may be pivoted inwardly within the stationary portion 19 thus providing access for a spoon or other implement and to permit the cook to taste of the food being cooked.

While I have provided three openings 18 for adjustment purposes, a larger or lesser number may be used depending upon the size of the hood 14.

It is obvious that certain changes and modifications may be made in the details of construction without departing from the general spirit of the invention.

I claim:

A semi-spherical hood of the character described adapted to be seated upon a cooking vessel, said hood comprising an outer stationary quarter-spherical portion and an inner pivoted quarter-spherical perforated portion, said perforated portion pivoted within said outer portion, an annular shoulder at the base of said portions bent at a right angle thereto, an annular flange depending from said shoulders at a right angle thereto, a bent out semicircular flange at the edge of said stationary portion acting as a stop for said pivoted portion, said annular flange with flexible ends depending from said stationary portion and extending beyond the central circumference of said vessel, threaded openings at the ends of said flange, a pair of opposed screws within two of said opposed openings for adjustably attaching said hood upon said cooking vessel.

MARCO DI SALINO.

REFERENCES CITED

The following references are of record in the file of this patent:

UNITED STATES PATENTS

| Number | Name | Date |
|---|---|---|
| 181,909 | Chinnock | Sept. 5, 1876 |
| 498,475 | Klein | May 30, 1893 |
| 1,080,478 | Reis | Dec. 2, 1913 |
| 1,959,191 | Acly | May 15, 1934 |